US012612758B2

(12) United States Patent
Hiranuma

(10) Patent No.: US 12,612,758 B2
(45) Date of Patent: Apr. 28, 2026

(54) WORK MACHINE AND WORK MACHINE SUPPORT SYSTEM

(71) Applicant: SUMITOMO HEAVY INDUSTRIES, LTD., Tokyo (JP)

(72) Inventor: Kazunori Hiranuma, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 236 days.

(21) Appl. No.: 18/475,440

(22) Filed: Sep. 27, 2023

(65) Prior Publication Data

US 2024/0025709 A1 Jan. 25, 2024

Related U.S. Application Data

(63) Continuation of application No. PCT/JP2022/016169, filed on Mar. 30, 2022.

(30) Foreign Application Priority Data

Mar. 31, 2021 (JP) .................................. 2021-060109

(51) Int. Cl.
*E02F 3/40* (2006.01)
*B66C 13/16* (2006.01)
(Continued)

(52) U.S. Cl.
CPC .............. *E02F 3/404* (2013.01); *B66C 13/16* (2013.01); *B66C 13/46* (2013.01); *E02F 3/963* (2013.01);
(Continued)

(58) Field of Classification Search
CPC ......... B66C 23/42; B66C 13/16; B66C 13/46;

B66C 1/585; B66C 3/005; B66C 3/16; B66C 3/20; B66C 23/54; E02F 3/963; E02F 9/26; E02F 3/40; E02F 9/2228; E02F 9/2285; E02F 9/2292; E02F 3/435;
(Continued)

(56) References Cited

U.S. PATENT DOCUMENTS 4,677,579 A * 6/1987 Radomilovich .......... E02F 9/26
73/862.56
11,976,437 B2* 5/2024 Sano ...................... E02F 9/2267
(Continued)

FOREIGN PATENT DOCUMENTS

JP H03-089098 U 9/1991
JP H07-227779 8/1995
(Continued)

OTHER PUBLICATIONS

International Search Report for PCT/JP2022/016169 mailed on Jun. 14, 2022.

*Primary Examiner* — Helal A Algahaim
*Assistant Examiner* — Leah N Miller
(74) *Attorney, Agent, or Firm* — IPUSA, PLLC

(57) ABSTRACT

A work machine includes an attachment rotatably attached to an upper turning body; a gripping part rotatably attached to the attachment, the gripping part gripping a long carried-material; and processing circuitry, and a memory storing computer-readable instructions, which when executed, cause the processing circuitry to calculate a weight of the carried-material, based on a torque for rotating the attachment.

20 Claims, 10 Drawing Sheets

(51) Int. Cl.

| | |
|---|---|
| *B66C 13/46* | (2006.01) |
| *E02F 3/96* | (2006.01) |
| *E02F 9/26* | (2006.01) |
| *E02F 9/22* | (2006.01) |

(52) U.S. Cl.
CPC ........... *E02F 9/26* (2013.01); *B60Y 2200/412* (2013.01); *E02F 3/40* (2013.01); *E02F 9/2228* (2013.01); *E02F 9/2285* (2013.01); *E02F 9/2292* (2013.01)

(58) Field of Classification Search
CPC ........... E02F 9/264; E02F 9/205; E02F 9/265; A01G 23/003; A01G 23/091
USPC ........................................................ 701/50
See application file for complete search history.

(56)                    References Cited

U.S. PATENT DOCUMENTS

| | | | |
|---|---|---|---|
| 2009/0139119 A1* | 6/2009 | Janardhan ............ | G01G 19/021 37/413 |
| 2017/0002547 A1* | 1/2017 | Omote .................... | E02F 9/264 |
| 2021/0054595 A1* | 2/2021 | Sano ...................... | E02F 9/2292 |
| 2022/0097621 A1* | 3/2022 | Nakamura ............ | E02F 9/2037 |

FOREIGN PATENT DOCUMENTS

| | | |
|---|---|---|
| JP | H09-091004 | 4/1997 |
| JP | 2002-021109 | 1/2002 |
| JP | 2010-037036 | 2/2010 |
| JP | 2015-062355 | 4/2015 |
| JP | 2016-147340 | 8/2016 |
| JP | 2020-139330 | 9/2020 |

\* cited by examiner

50  MACHINE GUIDANCE PART

51  GRAPPLE ANGLE CONTROL PART

60  CARRIED-MATERIAL WEIGHT PROCESSING PART

S10

S6F

WORK MACHINE AND WORK MACHINE SUPPORT SYSTEM

CROSS-REFERENCE TO RELATED APPLICATIONS

This application is a continuation application filed under 35 U.S.C. 111 (a) claiming benefit under 35 U.S.C. 120 and 365(c) of PCT International Application No. PCT/JP2022/016169, filed on Mar. 30, 2022, and designating the U.S., which claims priority to Japanese Patent Application No. 2021-060109 filed on Mar. 31, 2021. The entire contents of the foregoing applications are incorporated herein by reference.

BACKGROUND

Technical Field

The present disclosure relates to a work machine and a work machine support system.

Description of Related Art

For example, there is disclosed a forestry machine equipped with an engine, a hydraulic pump for discharging hydraulic oil by the power of the engine, and a harvester device driven by the hydraulic oil discharged from the hydraulic pump, the harvester device including a chainsaw for cutting raw wood, where the discharge flow rate of the hydraulic pump is increased at least when the driving of the chainsaw is selected.

SUMMARY

In an aspect of an embodiment of the present invention, a work machine includes:

an attachment rotatably attached to an upper turning body;

a gripping part rotatably attached to the attachment, the gripping part gripping a long carried-material; and processing circuitry, and a memory storing computer-readable instructions, which when executed, cause the processing circuitry to calculate a weight of the carried-material, based on a torque for rotating the attachment.

BRIEF DESCRIPTION OF THE DRAWINGS

FIG. 5 is a block diagram illustrating an adjustment operation for adjusting the center of gravity position of a carried-material.

DETAILED DESCRIPTION

In a work machine designed for gripping and carrying a long material such as round timber with a grapple, it is desirable to calculate the weight of such a carried-material.

Accordingly, it appears desirable to provide a work machine and a work machine support system to accurately calculate the weight of a carried-material in a case where the work machine is designed for gripping and carrying a long material.

Hereinafter, an embodiment will be described with reference to the accompanying drawings.

[Overview of Work Machine]

First, an overview of a work machine 100 according to the present embodiment will be described with reference to FIG. 1.

Figure 1:
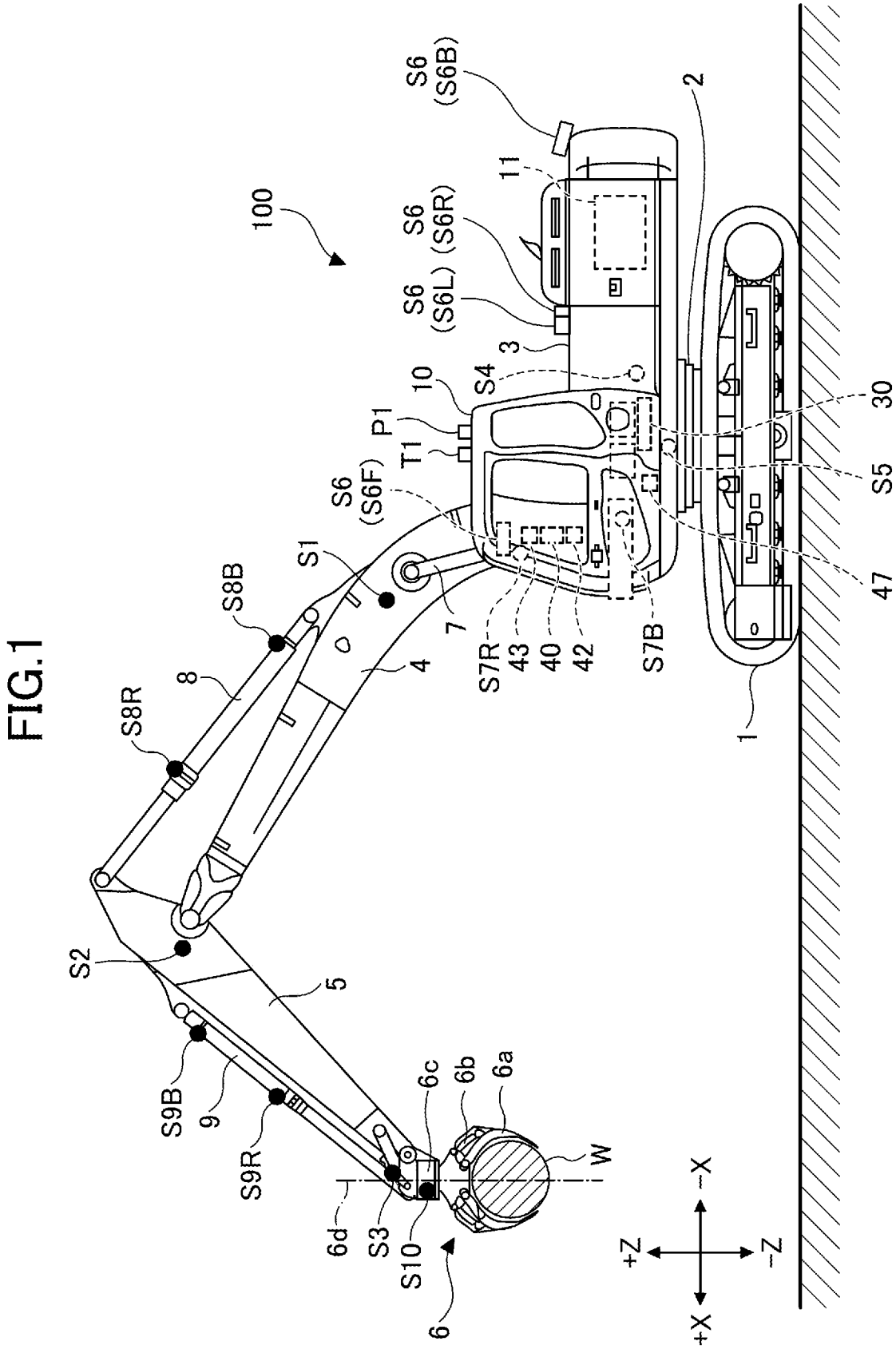
FIG. 1 is a side view illustrating a work machine according to a present embodiment.

FIG. 1 is a side view illustrating the work machine 100 according to the present embodiment. The work machine 100 according to the present embodiment holds a long carried-material W such as round timber (wood) by a grapple 6, and carries a material W (hereinafter referred to as a "carried-material W". The carried-material W carried by the work machine 100 is loaded, for example, onto a dump truck (not illustrated).

The work machine 100 according to the present embodiment includes a lower traveling body 1; an upper turning body 3 mounted on the lower traveling body 1 so as to be turnable via a turning mechanism 2; a boom 4 and an arm 5 constituting an attachment (working tool); and the grapple 6 rotatably attached to the attachment; and a cabin 10.

The lower traveling body 1 causes the work machine 100 to travel by allowing traveling hydraulic motors 1L and 1R (see FIG. 2, which will be described later) to be hydraulically driven by a pair of right and left crawlers. That is, a pair of traveling hydraulic motors 1L and 1R (examples of a traveling motor) drive a lower traveling body 1 (crawler) as a driven part.

The upper turning body 3 is driven by a hydraulic turning motor 2A (see FIG. 2, which will be described later), and turns with respect to the lower traveling body 1. That is, the hydraulic turning motor 2A is a turning driving part that drives the upper turning body 3 as a driven part, and is capable of changing the orientation of the upper turning body 3.

Note that the upper turning body 3 may be electrically driven by an electric motor (hereinafter referred to as "turning motor") instead of the hydraulic turning motor 2A. In other words, like the hydraulic turning motor 2A, the turning motor, is a turning driving part that drives the upper turning body 3 as a driven part, and is capable of changing the orientation of the upper turning body 3.

The boom 4 is pivotally attached to the front center of the upper turning body 3, the arm 5 is pivotally attached to the tip of the boom 4 so that the arm 5 can be vertically rotated, and the grapple 6 as an end attachment is pivotally attached to the tip of the arm 5 so that the grapple 6 can be vertically rotated. The boom 4, the arm 5, and the grapple 6 are hydraulically driven by a boom cylinder 7, an arm cylinder 8, and an end attachment cylinder 9, respectively, as hydraulic actuators.

The end attachment cylinder 9 is used to rotate (tilt) the grapple 6. The grapple 6 is provided with a claw part (gripping part) 6a which can be opened and closed, a grapple opening/closing cylinder 6b which opens and closes the claw part 6a, and a rotating hydraulic motor 6c which rotates the claw part 6a at a rotation axis.

The grapple 6 is an example of an end attachment, and another end attachment such as a harvester, or the like having a cutting tool, which grips a trunk of wood and moves the gripped wood in the axial direction to cut branches, may be attached to the tip of the arm 5 in place of the grapple 6 according to the work content, or the like.

The cabin 10 is an operator's cabin and is mounted on the front left side of the upper turning body 3.

[Shovel Configuration]

Next, a specific configuration of the work machine 100 according to the present embodiment will be described with reference to FIG. 2 in addition to FIG. 1.

Figure 2:
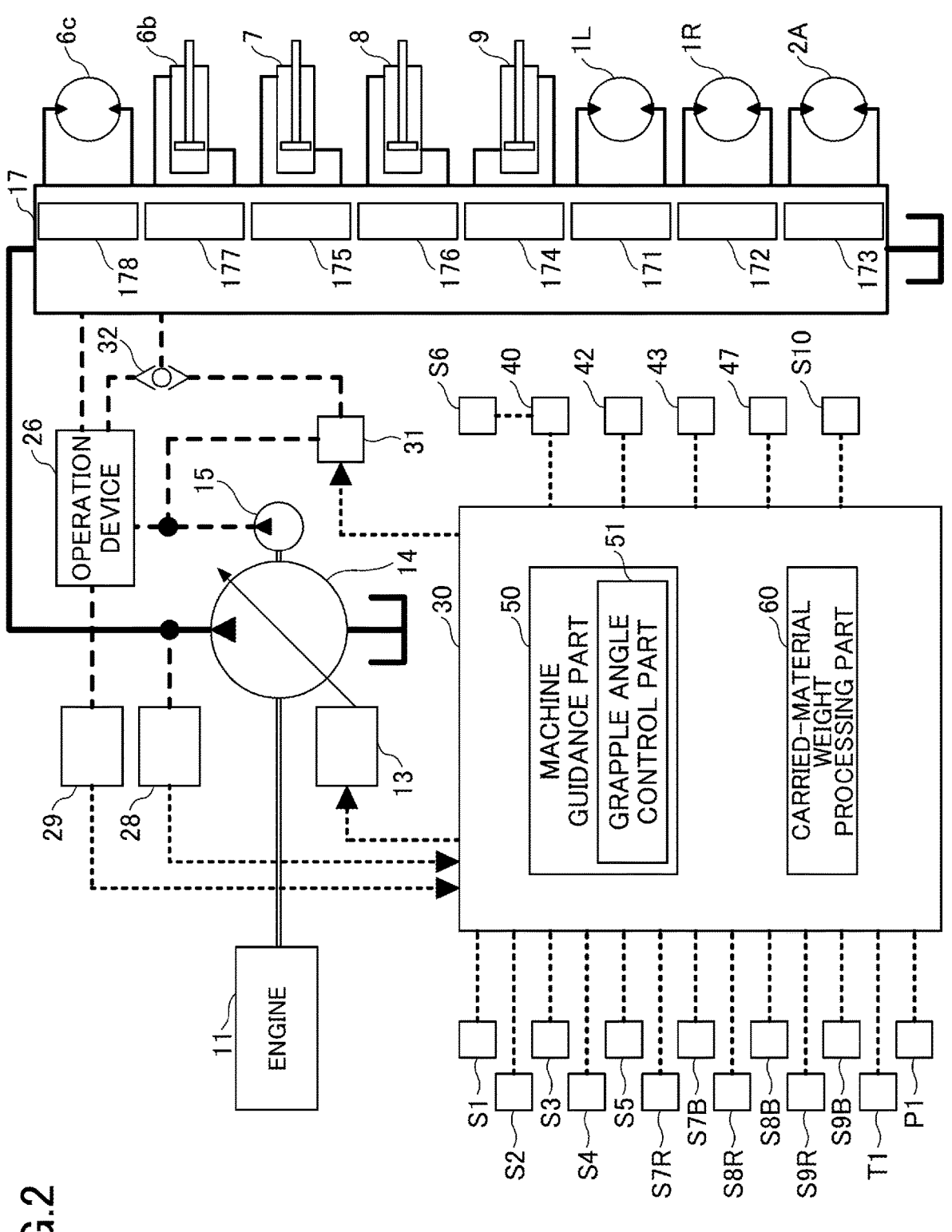
FIG. 2 is a schematic diagram illustrating an example of a configuration of a work machine according to the present embodiment.

FIG. 2 is a schematic diagram illustrating an example of a configuration of the work machine 100 according to the present embodiment.

In FIG. 2, a mechanical power system, a hydraulic oil line, a pilot line, and an electrical control system are indicated by double lines, solid lines, dashed lines, and dotted lines, respectively.

The drive system of the work machine 100 according to the present embodiment includes an engine 11, a regulator 13, a main pump 14, and a control valve 17. As described above, the hydraulic drive system of the work machine 100 according to the present embodiment includes hydraulic actuators such as traveling hydraulic motors 1L and 1R, a turning hydraulic motor 2A, a boom cylinder 7, an arm cylinder 8, and an end attachment cylinder 9 for hydraulically driving the lower traveling body 1, the upper turning body 3, the boom 4, the arm 5, and the grapple 6, respectively.

The engine 11 is a main power source in the hydraulic drive system, and is mounted, for example, at the rear part of the upper turning body 3. Specifically, the engine 11 rotates at a predetermined target speed under direct or indirect control by a controller 30, which will be described later, to drive the main pump 14 and a pilot pump 15. The engine 11 is, for example, a diesel engine fueled with diesel oil.

The regulator 13 controls a discharge amount of the main pump 14. For example, the regulator 13 adjusts the angle (inclination angle) of a swash plate of the main pump 14 in response to a control instruction from the controller 30.

Like the engine 11, the main pump 14 is, for example, mounted at the rear part of the upper turning body 3, and supplies hydraulic oil to the control valve 17 through a high-pressure hydraulic line. The main pump 14 is driven by the engine 11 as described above. The main pump 14 is, for example, a variable displacement hydraulic pump, and as described above, the stroke length of the piston is adjusted by adjusting the inclination angle of the swash plate by the regulator 13 under the control of the controller 30 to control a discharge flow rate (discharge pressure).

The control valve 17 is, for example, a hydraulic control device mounted in the central part of the upper turning body 3 to control the hydraulic drive system in response to an operator's operation of the operation device 26. The control valve 17 is connected to the main pump 14 via the high-pressure hydraulic line as described above, and selectively supplies hydraulic oil supplied from the main pump 14 to the hydraulic actuator (traveling hydraulic motors 1L and 1R, turning hydraulic motor 2A, boom cylinder 7, arm cylinder 8, and end attachment cylinder 9) in accordance with the operating state of the operation device 26. Specifically, the control valve 17 includes control valves 171 to 178 for controlling the flow rates and flow directions of hydraulic oil supplied from the main pump 14 to the respective hydraulic actuators. More specifically, the control valve 171 corresponds to the traveling hydraulic motor 1L, the control valve 172 corresponds to the traveling hydraulic motor 1R, and the control valve 173 corresponds to the turning hydraulic motor 2A. The control valve 174 corresponds to the end attachment cylinder 9, the control valve 175 corresponds to the boom cylinder 7, and the control valve 176 corresponds to the arm cylinder 8. The control valve 177 corresponds to the grapple opening/closing cylinder 6b, and the control valve 178 corresponds to the rotating hydraulic motor 6c.

The operation system of the work machine 100 according to the present embodiment includes a pilot pump 15 and an operation device 26. The operation system of the work machine 100 includes a shuttle valve 32 as a configuration related to a machine control function by the controller 30 to be described later.

The pilot pump 15 is, for example, mounted on the rear part of the upper turning body 3, and supplies pilot pressure to the operation device 26 via the pilot line. The pilot pump 15 is, for example, a fixed capacity hydraulic pump, and is driven by the engine 11 as described above.

The operation device 26 is provided near the cockpit of the cabin 10, and is an operation input means for an operator to operate various operation elements (lower traveling body 1, upper turning body 3, boom 4, arm 5, grapple 6, etc.). In other words, the operation device 26 is an operation input means for an operator to operate hydraulic actuators (i.e., traveling hydraulic motors 1L and 1R, turning hydraulic motors 2A, boom cylinders 7, arm cylinders 8, end attachment cylinders 9, etc.) for driving respective operation elements. The operation device 26 is connected to the control valve 17 either directly through the pilot line on the secondary side of the operation device 26 or indirectly through the shuttle valve 32 described below provided on the pilot line on the secondary side. As a result, the pilot pressure corresponding to the operating states of the lower traveling body 1, the upper turning body 3, the boom 4, the arm 5, the grapple 6, etc. in the operation device 26 can be input to the control valve 17. Therefore, the control valve 17 can drive the respective hydraulic actuators according to the operating states in the operation device 26. The operation device 26 includes, for example, a lever device for operating the arm 5 (arm cylinder 8). The operation device 26 includes, for example, a lever device for operating the boom 4 (boom cylinder 7), the grapple 6 (end attachment cylinder 9), and the upper turning body 3 (turning hydraulic motor 2A). The operation device 26 includes, for example, a lever device and a pedal device for operating each of a pair of right and left crawlers (traveling hydraulic motors 1L and 1R) of the lower traveling body 1.

The shuttle valve 32 has two inlet ports and one outlet port, and outputs to the outlet port hydraulic oil having the higher pilot pressure among the pilot pressures input to the two inlet ports. The shuttle valve 32 has one of the two inlet ports connected to the operation device 26 and the other connected to a proportional valve 31. The outlet port of the shuttle valve 32 is connected through the pilot line to a pilot port of a corresponding one of the control valves in the control valve 17. Therefore, the shuttle valve 32 can apply the higher one of the pilot pressure generated by the operation device 26 and the pilot pressure generated by the proportional valve 31 to the pilot port of the corresponding control valve. In other words, the controller 30, which will be described later, can cause the proportional valve 31 to output a pilot pressure higher than the pilot pressure on the secondary side output from the operation device 26 to control the corresponding one of the control valves so that the controller 30 can control operations of various operation elements without relying on the operation of the operation device 26.

Note that the operation device 26 (left operation lever, right operation lever, left traveling lever, and right traveling lever) may not be a hydraulic pilot type that outputs a pilot pressure, but may be an electric type that outputs an electric signal. In such a case, an electric signal from the operation device 26 is input to the controller 30, and the controller 30 controls each of the control valves 171 to 178 in the control valve 17 according to the input electric signal, thereby implementing the operations of various hydraulic actuators according to the operation contents with respect to the operation device 26. For example, the control valves 171 to 178 in the control valve 17 may each be a solenoid type spool valve driven by an instruction from the controller 30. For example, a solenoid valve that operates in response to an electrical signal from the controller 30 may be disposed between the pilot pump 15 and the pilot port of each of the control valves 171 to 178. In this case, when a manual operation using the electric operation device 26 is performed, the controller 30 controls the solenoid valve, and increases or decreases the pilot pressure by an electrical signal corresponding to the operation amount (e.g., the lever operation amount), so that each of the control valves 171 to 178 can operate in accordance with the operation contents with respect to the operation device 26.

The control system of the work machine 100 according to the present embodiment includes the controller 30, a discharge pressure sensor 28, an operation pressure sensor 29, the proportional valve 31, a display device 40, an input device 42, an audio output device 43, a storage device 47, a boom angle sensor S1, an arm angle sensor S2, an end attachment angle sensor S3, an airframe inclination sensor S4, a turning state sensor S5, an imaging device S6, a positioning device P1, and a communication device T1.

The controller 30 (an example of a control device) is provided in the cabin 10, for example, and controls the drive of the work machine 100. The controller 30 may be implemented by any hardware, software, or combination thereof. For example, the controller 30 may be configured around a CPU (Central Processing Unit), a ROM (Read Only Memory), a RAM (Random Access Memory), a non-volatile auxiliary storage device, and a microcomputer including various input/output interfaces. The controller 30 may implement various functions by executing various programs stored in, for example, a ROM or a non-volatile auxiliary storage device on the CPU. The controller 30 and the control device may, for example, mainly include processing circuitry and a memory.

For example, the controller 30 sets a target rotation speed based on a work mode, or the like set in advance by a predetermined operation of an operator, or the like, and performs drive control for making the engine 11 rotate at a constant rate.

For example, the controller 30 outputs a control instruction to the regulator 13 as necessary, and changes the discharge amount of the main pump 14.

For example, the controller 30 controls a machine guidance function that guides an operator's manual operation of the work machine 100 through the operation device 26. The controller 30 controls a machine control function that automatically supports an operator's manual operation of the work machine 100 through the operation device 26. That is, the controller 30 includes a machine guidance part 50 as a function part related to the machine guidance function and the machine control function. In addition, the controller 30 includes a carried-material weight processing part 60 to be described later.

Note that some of the functions of the controller 30 may be implemented by another controller (control device). That is, the functions of the controller 30 may be implemented in a manner distributed by a plurality of controllers. For example, the machine guidance function and the machine control function may be implemented by dedicated controllers (dedicated control devices).

The discharge pressure sensor 28 detects a discharge pressure of the main pump 14. A detection signal corresponding to the discharge pressure detected by the discharge pressure sensor 28 is taken into the controller 30.

As described above, the operation pressure sensor 29 detects a pilot pressure on the secondary side of the operation device 26, that is, the pilot pressure corresponding to the operating state (e.g., operation contents such as operation direction and operation amount) for each of the operating elements (i.e., hydraulic actuators) in the operation device 26. The detection signals of the pilot pressures corresponding to the operating states of the lower traveling body 1, the upper turning body 3, the boom 4, the arm 5, the grapple 6, and the like in the operation device 26 by the operation pressure sensor 29 are captured in the controller 30.

In place of the operation pressure sensor 29, other sensors capable of detecting the operating states of the respective operation elements in the operation device 26 may be provided; examples of such other sensors include encoders and potentiometers capable of detecting the operating amount (inclination amount) and inclination direction of the lever device, and the like.

The proportional valve 31 is provided in the pilot line connecting the pilot pump 15 and the shuttle valve 32, and is configured to change a flow passage area (cross-sectional area through which hydraulic oil can flow). The proportional valve 31 operates in response to a control instruction input from the controller 30. This allows the controller 30 to supply the hydraulic oil discharged from the pilot pump 15 to a pilot port of a corresponding one of the control valves in the control valve 17 via the proportional valve 31 and the shuttle valve 32, even when the operator is not operating the operation device 26 (specifically, the lever device).

The display device 40 is provided in the cabin 10 at a location easily visible to a seated operator, and displays various information images under control by the controller 30. The display device 40 may be connected to the controller 30 via an on-board communication network such as a CAN (Controller Area Network) or may be connected to the controller 30 via a one-to-one leased line.

The input device 42 is provided within reach of a seated operator in the cabin 10, receives various operation inputs by the operator, and outputs a signal corresponding to the operation input to the controller 30. The input device 42 includes a touch panel mounted on a display of a display device for displaying various information images, a knob switch provided at the tip of a lever part of a lever device, a button switch, a lever, a toggle, a rotating dial, and the like installed around the display device 40. A signal correspond-ing to the operation content for the input device 42 is taken into the controller 30.

The audio output device 43 is provided in the cabin 10, for example, and is connected to the controller 30 to output audio under the control by the controller 30. The audio output device 43 is, for example, a speaker or a buzzer. The audio output device 43 outputs various information in response to an audio output instruction from the controller 30.

The storage device 47 is provided in the cabin 10, for example, and stores various information under the control by the controller 30. The storage device 47 is, for example, a nonvolatile storage medium such as a semiconductor memory. The storage device 47 may store information output by various devices during operation of the work machine 100, and may store information acquired through various devices before operation of the work machine 100 is started. For example, the storage device 47 may store data on a target construction surface acquired through the commu-nication device T1 or the like, or set through the input device 42 or the like. The target construction surface may be set (stored) by the operator of the work machine 100 or set by a construction manager, or the like.

The boom angle sensor S1 is attached to the boom 4, and detects the angle of elevation (hereinafter referred to as a "boom angle") of the boom 4 with respect to the upper turning body 3, for example, the angle famed by a straight line connecting the fulcrums of both ends of the boom 4 with respect to the turning plane of the upper turning body 3 in side view. The boom angle sensor S1 may include, for example, a rotary encoder, an acceleration sensor, a six-axis sensor, an inertial measurement unit (EMU), or the like. The boom angle sensor S1 may include a potentiometer using a variable resistor, a cylinder sensor configured to detect the stroke amount of a hydraulic cylinder (boom cylinder 7) corresponding to the boom angle, or the like. The same applies to the arm angle sensor S2 and the end attachment angle sensor S3. The detection signal corresponding to the boom angle by the boom angle sensor S1 is taken into the controller 30.

The arm angle sensor S2 is attached to the arm 5, and detects the rotation angle (hereinafter referred to as an "arm angle") of the arm 5 with respect to the boom 4, for example, the angle formed by a straight line connecting the fulcrums of both ends of the arm 5 with respect to a straight line connecting the fulcrums of both ends of the boom 4 in side view. The detection signal corresponding to the arm angle by the arm angle sensor S2 is taken into the controller 30.

The end attachment angle sensor S3 is attached to the grapple 6, and detects the rotation angle (hereinafter referred to as a "tilt angle of the grapple 6") of the grapple 6 with respect to the arm 5, for example, the angle formed by the rotation axis 6d of the grapple 6 with respect to the straight line connecting the fulcrums of both ends of the arm 5, in side view. The detection signal corresponding to the tilt angle of the grapple 6 by the end attachment angle sensor S3 is taken into the controller 30.

The airframe inclination sensor S4 detects an inclination state of the airframe (upper turning body 3 or lower traveling body 1) with respect to the horizontal plane. The airframe inclination sensor S4 is attached to the upper turning body 3, for example, and detects inclination angles (hereinafter referred to as "front/back inclination angle" and "left/right inclination angle") of the work machine 100 (i.e., the upper turning body 3) around two axes in the front/back direction and the left/right direction. The airframe inclination sensor S4 may include, for example, a rotary encoder, an accelera-tion sensor, a six-axis sensor, an INIU, or the like. The detection signals corresponding to the inclination angles (the front/back inclination angle and the left/right inclination angle) by the airframe inclination sensor S4 are taken into the controller 30.

The turning state sensor S5 outputs detection information on the turning state of the upper turning body 3. The turning state sensor S5 detects, for example, the turning angular velocity and the turning angle of the upper turning body 3. The turning state sensor S5 may include, for example, a gyro sensor, a resolver, a rotary encoder, and the like. The detection signal corresponding to the turning angle and the turning angular velocity of the upper turning body 3 by the turning state sensor S5 is taken into the controller 30.

The imaging device S6 as a spatial recognition device images an area around of the work machine 100. The imaging device S6 includes a camera S6F configured to image the front side of the work machine 100, a camera S6L configured to image the left side of the work machine 100, a camera S6R configured to image the right side of the work machine 100, and a camera S6B configured to image the rear side of the work machine 100.

The camera S6F is mounted, for example, on the ceiling of the cabin 10, that is, inside the cabin 10. The camera S6F may also be mounted on the exterior of the cabin 10, such as the roof of the cabin 10 or the side surface of the boom 4. The camera S6L is mounted on the left end of the upper surface of the upper turning body 3, the camera S6R is mounted on the right end of the upper surface of the upper turning body 3, and the camera S6B is mounted on the rear end of the upper surface of the upper turning body 3.

The imaging device S6 (cameras S6F, S6B, S6L, S6R) is, for example, a monocular wide-angle camera having a very wide angle of view. The imaging device S6 may be a stereo camera, a distance image camera, or the like. The images captured by the imaging device S6 are taken into the controller 30 via the display device 40.

The imaging device S6 as a spatial recognition device may function as an object detection device. In this case, the imaging device S6 may detect an object existing around the work machine 100. The object to be detected may include, for example, a person, an animal, a vehicle, a construction machine, a building, a hole, etc. The imaging device S6 may calculate the distance from the imaging device S6 or the work machine 100 to the recognized object. The imaging device S6 as the object detection device may include, for example, a stereo camera, a distance image sensor, and the like. The spatial recognition device is, for example, a monocular camera having an imaging element such as CCD or CMOS, and outputs the captured image to the display device 40. The spatial recognition device may be configured to calculate the distance from the spatial recognition device or the work machine 100 to the recognized object. In addition to the imaging device S6, other object detection devices such as, for example, an ultrasonic sensor, a milli-meter wave radar, a LIDAR, and an infrared sensor may be provided as additional spatial recognition devices. When a millimeter wave radar, an ultrasonic sensor, or a laser radar is used as a spatial recognition device, the distance and direction of an object may be detected from the reflected signal by transmitting a large number of signals (such as laser light) to the object and receiving the reflected signal.

The imaging device S6 may be directly connected to the controller 30 in a communicable manner.

A boom rod pressure sensor S7R and a boom bottom pressure sensor S7B are attached to the boom cylinder 7. An arm rod pressure sensor S8R and an arm bottom pressure sensor S8B are attached to the arm cylinder 8. An end attachment rod pressure sensor S9R and an end attachment bottom pressure sensor S9B are attached to the end attachment cylinder 9. The boom rod pressure sensor S7R, the boom bottom pressure sensor S7B, the arm rod pressure sensor S8R, the arm bottom pressure sensor S8B, the end attachment rod pressure sensor S9R, and the end attachment bottom pressure sensor S9B are collectively referred to as "cylinder pressure sensors".

The boom rod pressure sensor S7R detects a pressure (hereinafter referred to as a "boom rod pressure") in the rod-side oil chamber of the boom cylinder 7, and the boom bottom pressure sensor S7B detects a pressure (hereinafter referred to as a "boom bottom pressure") in the bottom-side oil chamber of the boom cylinder 7. The arm rod pressure sensor S8R detects a pressure (hereinafter referred to as an "arm rod pressure") in the rod-side oil chamber of the arm cylinder 8, and the arm bottom pressure sensor S8B detects a pressure (hereinafter referred to as an "arm bottom pressure") in the bottom-side oil chamber of the arm cylinder 8. The end attachment rod pressure sensor S9R detects a pressure (hereinafter referred to as an "end attachment rod pressure") in the rod-side oil chamber of the end attachment cylinder 9, and the end attachment bottom pressure sensor S9B detects a pressure (hereinafter referred to as an "end attachment bottom pressure") in the bottom-side oil chamber of the end attachment cylinder 9.

A grapple rotation angle sensor S10 is attached to the grapple 6, and detects a rotation angle of the grapple 6 around the rotation axis 6d. The grapple rotation angle sensor S10 may include, for example, a gyro sensor, a resolver, a rotary encoder, and the like. The detection signal corresponding to the rotation angle of the grapple 6 by the grapple rotation angle sensor S10 is taken into the controller 30.

The positioning device P1 measures a position and an orientation of the upper turning body 3. The positioning device P1 is, for example, a GNSS (Global Navigation Satellite System) compass, which detects the position and the orientation of the upper turning body 3, and detection signals corresponding to the position and the orientation of the upper turning body 3 are taken into the controller 30. The function of detecting the orientation of the upper turning body 3 among the functions of the positioning device P1 may be replaced by an orientation sensor attached to the upper turning body 3.

The communication device T1 communicates with external devices through a predetermined network including a mobile communication network, a satellite communication network, an Internet network, or the like with a base station as a terminal. The communication device T1 is, for example, a mobile communication module corresponding to a mobile communication standard such as LTE (Long Term Evolution), 4G (4th Generation), 5G (5th Generation), or a satellite communication module for connecting to a satellite communication network.

The machine guidance part 50 executes, for example, control of the work machine 100 related to the machine guidance function. The machine guidance part 50 transmits, for example, work information to the operator through the display device 40, the audio output device 43, or the like. The machine guidance part 50 notifies the operator of work information through the display device 40, the audio output device 43, or the like, and guides the operator to operate the work machine 100 through the operation device 26.

The machine guidance part 50 executes, for example, the control of the work machine 100 related to the machine control function. The machine guidance part 50 has a grapple angle control part 51. The grapple angle control part 51 can control the rotating hydraulic motor 6c to rotate the gripping part (claw part 6a) of the grapple 6.

[Carried-Material Weight Processing Part 60]

Figure 3:
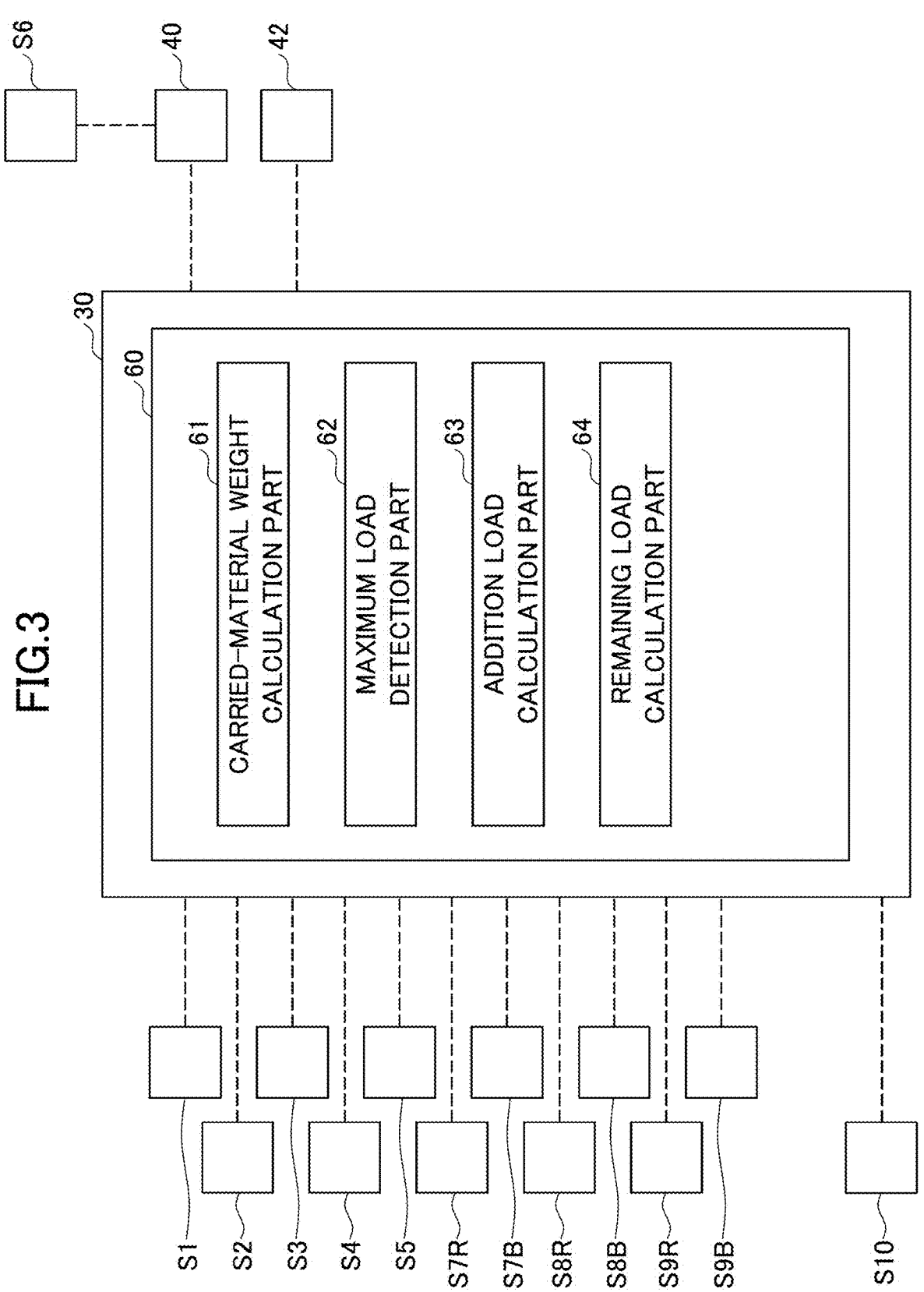
FIG. 3 is a schematic diagram illustrating an example of a configuration portion of the work machine according to the present embodiment, which is related to a carried-material weight detection function.

Next, with reference to FIG. 3, details of the configuration of a carried-material weight detection function of the work machine 100 according to the present embodiment will be described. FIG. 3 is a schematic diagram illustrating an example of a configuration of the carried-material weight detection function of the work machine 100 according to the present embodiment.

As described in FIG. 3, the controller 30 includes a carried-material weight processing part 60 as a functional part related to a function that detects the weight of the carried-material W gripped by the grapple 6.

The weight processing part 60 includes a carried-material weight calculation part 61, a maximum load detection part 62, an addition load calculation part 63, and a remaining load calculation part 64.

The carried-material weight calculation part 61 calculates the weight of the carried-material W carried by the grapple 6. The carried-material weight calculation part 61 calculates the weight of the carried-material W based on a thrust of the boom cylinder 7. The carried-material weight calculation part 61 calculates the weight of the carried-material W in a state in which the long carried-material W such as round timber (wood) is gripped by the gripping part (claw part 6a) of the grapple 6 of the work machine 100. A method of calculating the weight of the carried-material W in the carried-material weight calculation part 61 will be described later.

A maximum load detection part 62 detects the maximum load of the dump truck (not illustrated) to be loaded with the carried-material W. For example, the maximum load detection part 62 specifies the dump truck to be loaded with the carried-material W based on an image captured by the imaging device S6. Next, the maximum load detection part 62 detects the maximum load of the dump truck based on the specified image of the dump truck. For example, the maximum load detection part 62 determines the type (size, etc.) of the dump truck based on the specified image of the dump truck. The maximum load detection part 62 has a table that associates types of vehicle with the corresponding maximum load, and determines the maximum load of the dump truck based on the type of vehicle determined from the image and the table. The input device 42 inputs the maximum load of the dump truck, the type of vehicle, etc., and the maximum load detection part 62 may determine the maximum load of the dump truck based on the input information of the input device 42.

The addition load calculation part 63 calculates the total weight of the carried-material W loaded on the loading bed of the dump truck. That is, every time the carried-material W is loaded onto the loading bed of the dump truck by the grapple 6, the addition load calculation part 63 calculates the total weight of the carried-material W loaded on the loading bed of the dump truck (added up load) by adding the weight of the carried-material W carried by the grapple 6 calculated by the carried-material weight calculation part 61. When the dump truck to be loaded with the carried-material W becomes a new dump truck, the added up load is reset.

The remaining load calculation part 64 calculates the difference between the maximum load of the dump truck detected by the maximum load detection part 62 and the current added up load calculated by the addition load calculation part 63 as a remaining load. The remaining load is the weight of the remaining carried-material W that is allowed to be loaded on the dump truck.

The display device 40 may display the weight of the carried-material W gripped and carried by the grapple 6, which is calculated by the carried-material weight calculation part 61, the maximum load of the dump truck detected by the maximum load detection part 62, the added up load of the dump truck calculated by the addition load calculation part 63 (the total weight of the carried-material W loaded on the loading bed), and the remaining load calculated by the remaining load calculation part 64 (the remaining load is a remaining carried-material W that is allowed to be loaded).

The display device 40 may be configured to issue a warning when the added up load exceeds the maximum load. In addition, the display device 40 may be configured to issue a warning when the calculated weight of the carried-material W gripped and carried by the grapple 6 exceeds the remaining load. The warning is not limited to the warning displayed on the display device 40, and may be an audio output by the audio output device 43. Thus, the carried-material W may be prevented from being loaded beyond the maximum load of the dump truck.

[Carried-Material Weight Calculation Part 61]

Next, with reference to FIG. 4, a method of calculating the weight of the carried-material W gripped and carried by the grapple 6 in the carried-material weight calculation part 61 will be described. In this method, the weight of the carried-material W gripped and carried by the grapple 6 is calculated based on the thrust of the boom cylinder 7.

Figure 4:
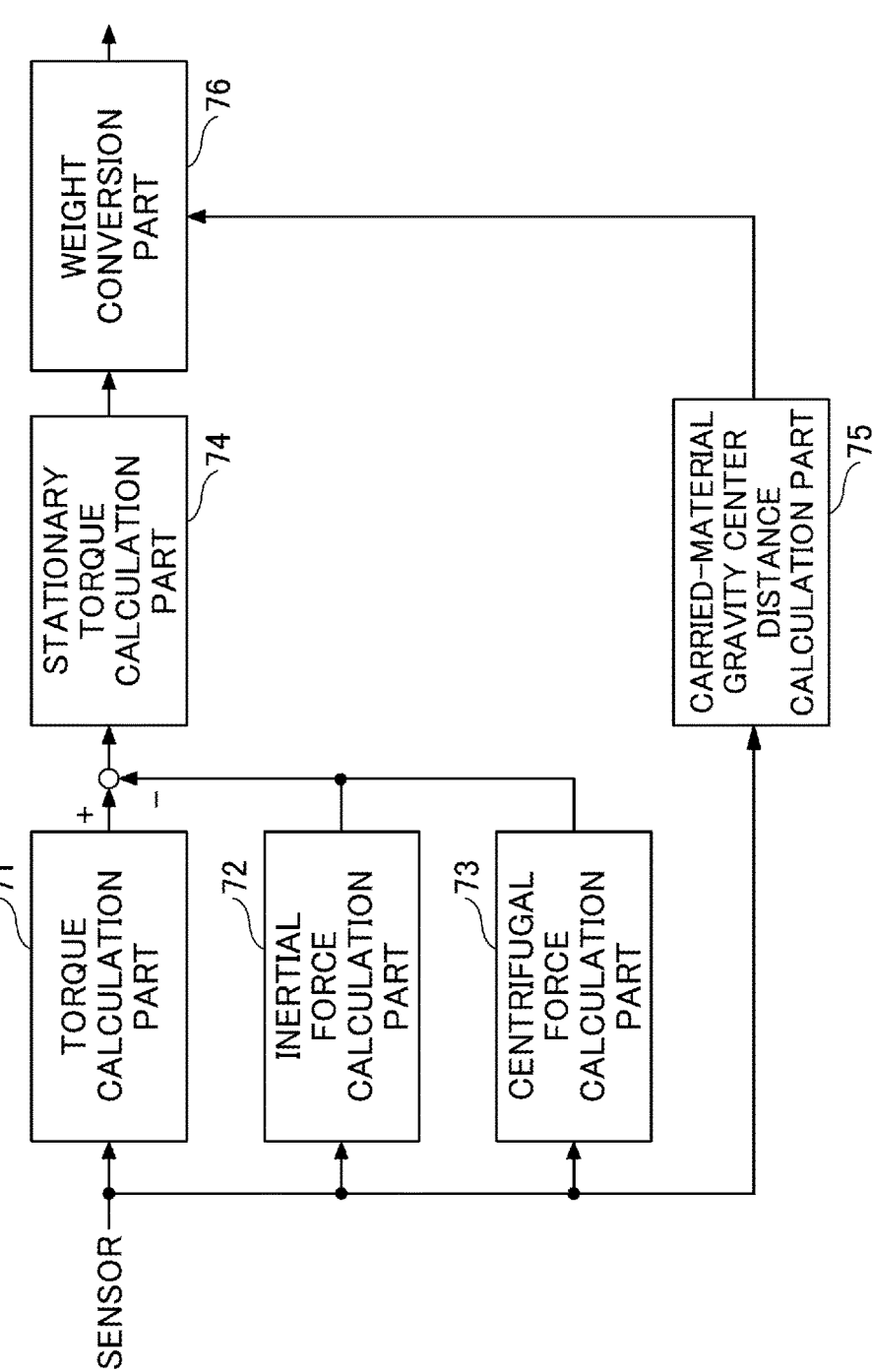
FIG. 4 is a block diagram illustrating processing of a carried-material weight calculation part.

FIG. 4 is a block diagram illustrating processing of the carried-material weight calculation part 61. The carried-material weight calculation part 61 includes a torque calculation part 71, an inertia force calculation part 72, a centrifugal force calculation part 73, a stationary torque calculation part 74, a carried-material gravity center distance calculation part 75, and a weight conversion part 76.

The torque calculation part 71 calculates torque (detected torque) around the foot pin of the boom 4. The torque is calculated based on the pressures (boom rod pressure sensor S7R, boom bottom pressure sensor S7B) of the hydraulic oil of the boom cylinder 7.

The inertia force calculation part 72 calculates the torque (inertia term torque) around the foot pin of the boom 4 due to the inertia force. The inertia team torque is calculated based on the angular acceleration around the foot pin of the boom 4 and the moment of inertia around the foot pin of the boom 4. The angular acceleration and the moment of inertia around the foot pin of the boom 4 are calculated based on the output of attitude sensors (e.g., boom angle sensor S1, arm angle sensor S2, end attachment angle sensor S3, airframe inclination sensor S4, turning state sensor S5).

The centrifugal force calculation part 73 calculates the torque (centrifugal term torque) around the foot pin of the boom 4 due to the Coriolis and centrifugal forces. The centrifugal term torque is calculated based on the angular velocity around the foot pin of the boom 4 and the weight of the boom 4. The angular velocity around the foot pin of the boom 4 is calculated based on the output of the attitude sensors. The weight of the boom 4 is known.

The stationary torque calculation part 74 calculates the stationary torque $\tau_W$, which is the torque around the foot pin of the boom 4 when the attachment is stationary, based on the detected torque by the torque calculation part 71, the inertia term torque by the inertia force calculation part 72, and the centrifugal term torque by the centrifugal force calculation part 73. The equation of the torque around the foot pin of the boom 4 is represented by Equation (1). The $\tau$ on the left side of Equation (1) indicates the detected torque, the first term on the right side indicates the inertial term torque, the second term on the right side indicates the centrifugal term torque, and the third term on the right side indicates the stationary torque $\tau_W$.

[Equation 1]

$$\tau = J\ddot{\theta} + h(\dot{\theta},\theta)\dot{\theta} + \tau_W \tag{1}$$

As illustrated in Equation (1), the stationary torque $\tau_W$ can be calculated by subtracting the inertial term torque and the centrifugal term torque from the detected torque $\tau$. Thus, the present embodiment may be able to compensate for the effect caused by the rotating operation around the pin such as a boom.

The carried-material gravity center distance calculation part 75 calculates a horizontal distance in the front direction (center of gravity distance in the front direction) of the work machine 100 (upper turning body 3) from the foot pin of the boom 4 to the center of gravity of the carried-material W gripped by the grapple 6. The front direction of the work machine 100 (upper turning body 3) is the direction in which the attachment expands and contracts (+X direction in FIG. 1 and FIG. 6 to be described later). In other words, the front direction of the work machine 100 (upper turning body 3) is the direction defined by the intersection of the plane normal to the rotation axis (the foot pin of the boom 4) of the rotating boom 4 and the horizontal plane. A method of calculating the center of gravity distance in the front direction in the carried-material gravity center distance calculation part 75 will be described later.

The weight conversion part 76 calculates the weight of the carried-material W based on the stationary torque $\tau_W$ calculated by the stationary torque calculation part 74 and the center of gravity distance in the front direction calculated by the carried-material gravity center distance calculation part 75. The weight of the carried-material W can be calculated, for example, by dividing the torque obtained by subtracting the torque when the grapple 6 is not gripping the carried-material W from the stationary torque $\tau_W$ calculated by the stationary torque calculation part 74 by the center of gravity distance in the front direction calculated by the carried-material gravity center distance calculation part 75.

In such a manner, the carried-material weight calculation part 61 can calculate the weight of the carried-material W by compensating for the inertia team and the centrifugal term during the operation of the boom 4.

Figure 6:
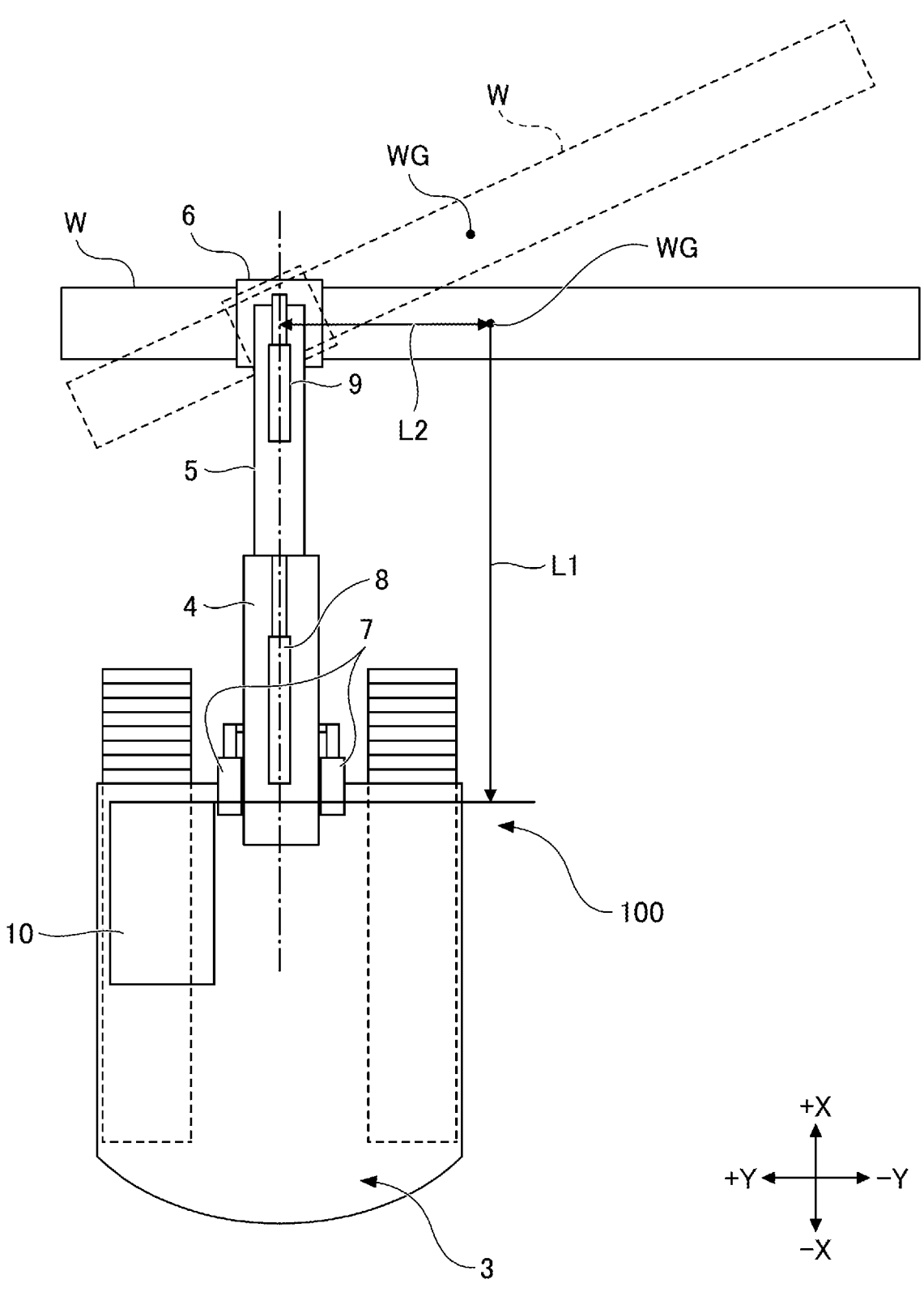
FIG. 6 is a plan view illustrating a work machine that grips a long carried-material.

Next, a method of calculating a horizontal distance in the front direction (center of gravity distance in the front direction) of the work machine 100 (upper turning body 3) from the foot pin of the boom 4 to the center of gravity of the carried-material W gripped by the grapple 6 in the carried-material gravity center distance calculation part 75 will be described with reference to FIGS. 5 to 6.

Figure 5:
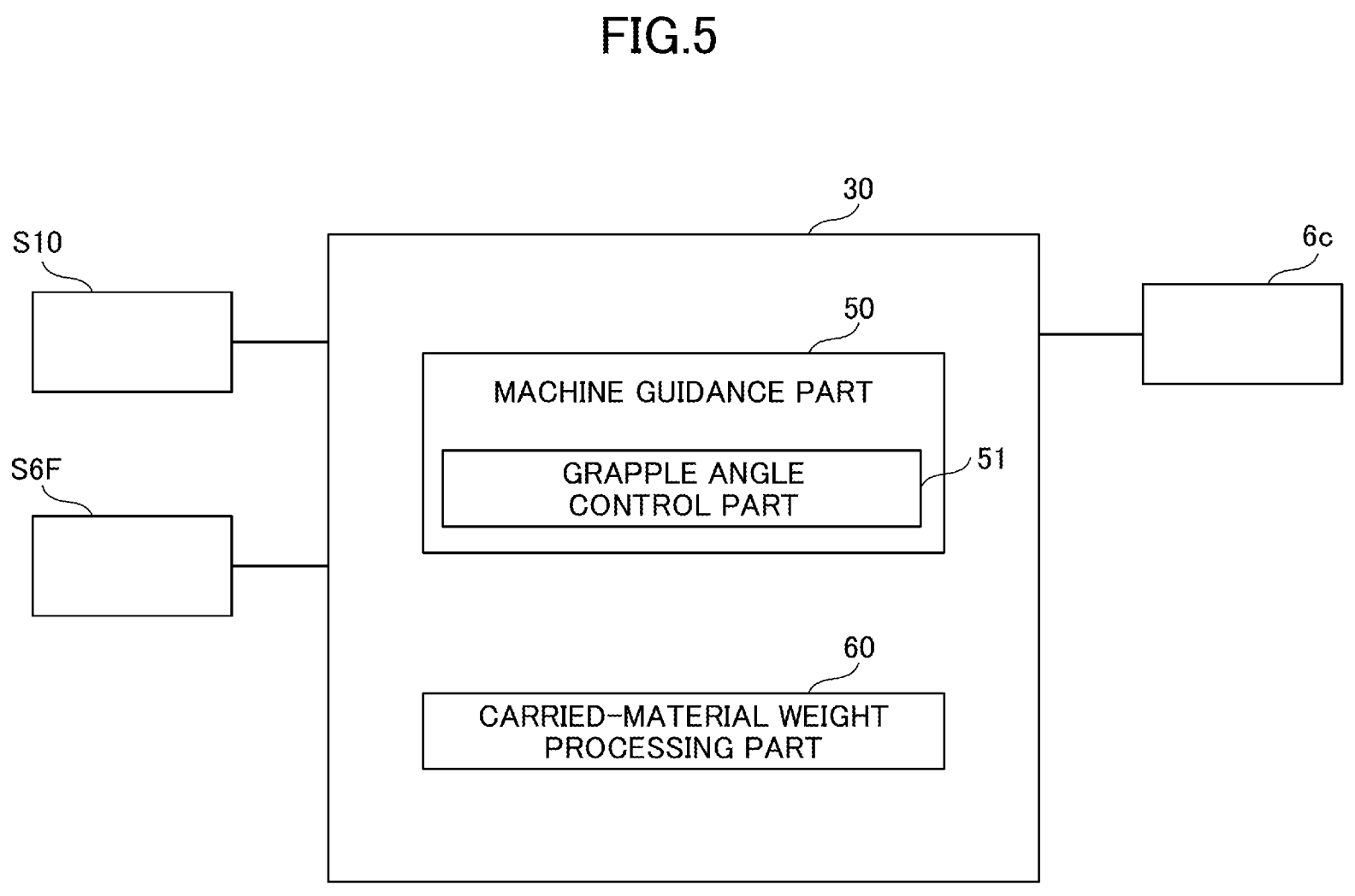

FIG. 5 is a block diagram illustrating an adjustment operation for adjusting the center of gravity of the carried-material W. FIG. 6 is a plan view illustrating the work machine 100 gripping a long carried-material W.

As illustrated in FIG. 5, the rotation angle of the grapple 6 detected by the grapple rotation angle sensor S10 is input to the controller 30. The controller 30 has a grapple angle control part 51 of the machine guidance part 50. As illustrated in FIG. 2, the grapple angle control part 51 is configured to control the proportional valve 31 to control the control valve 178 of the control valve 17. Thus, the grapple angle control part 51 can control the operation of the rotating hydraulic motor 6c.

Next, the operation of calculating the weight of the carried-material W will be described.

First, the operator operates the operation device 26 to grip and raise a long carried-material W with the grapple 6. An example of the carried-material W in a state where the carried-material W is gripped by the grapple 6 is illustrated by a broken line in FIG. 6. Here, the position at which the carried-material W is gripped by the grapple 6 is not necessarily at the center in the longitudinal direction of the carried-material W, and is gripped at a position closer to one side in the longitudinal direction of the carried-material W, as illustrated by the broken line in FIG. 6. Therefore, the center of gravity position WG of the carried-material W is not fixed.

Next, the operator operates the operation device 26 with respect to the grapple to rotate the grapple. The grapple angle control part 51 detects the longitudinal direction of the long carried-material W based on the rotation angle of the grapple 6 detected by the grapple rotation angle sensor S10, and rotates the gripping part of the grapple 6 to a predetermined rotational position.

Here, the gripping part of the grapple 6 is rotated so that the longitudinal direction of the long carried-material W gripped by the grapple 6 is at a right angle to the front direction (+X direction) of the work machine 100 (upper turning body 3). In other words, the gripping part of the grapple 6 is rotated so that the longitudinal direction of the long carried-material W gripped by the grapple 6 is a vehicle width direction of the work machine 100 (upper turning body 3). In other words, the gripping part of the grapple 6 is rotated so that the longitudinal direction of the long carried-material W gripped by the grapple 6 is parallel to the rotation axis (foot pin of the boom 4) of the boom 4 performing the rotating operation.

The carried-material W after rotation is illustrated by a solid line. As illustrated in FIG. 6, even when the position at which the carried-material W is gripped by the grapple 6 is at a position closer to one of the two sides in the longitudinal direction of the carried-material W, the horizontal distance L1 in the front direction (center of gravity distance in the front direction) of the work machine 100 (upper turning body 3) from the foot pin of the boom 4 to the center of gravity position WG of the carried-material W gripped by the grapple 6 can be determined.

Thus, the carried-material gravity center distance calculation part 75 (see FIG. 4) can calculate the center of gravity distance L1 in the front direction based on the output of the attitude sensors (e.g., boom angle sensor S1, arm angle sensor S2, end attachment angle sensor S3, airframe inclination sensor S4, turning state sensor S5).

Next, the operator operates the operation device 26 to raise the boom 4. That is, the boom 4 is rotated by using the foot pin of the boom 4 as a rotation axis. When the boom is raised, the carried-material weight processing part 60 (the carried-material weight calculation part 61) calculates the weight of the carried-material W (see FIG. 4). Note that the distance L2 from the position at which the carried-material W is gripped by the grapple 6 to the center of gravity position WG of the carried-material W does not affect the torque when the boom is raised. In addition, the carried-material weight processing part 60 may calculate the weight of the carried-material W in a predetermined control cycle, and adopt the weight calculated when the longitudinal direction of the gripped long carried-material W is at a right angle to the front direction (+X direction) of the work machine 100 (upper turning body 3) as the weight of the carried-material W.

In the weight calculation method of the carried-material W by the work machine 100 according to the present embodiment, the center of gravity distance L1 in the front direction can be accurately calculated by making the longitudinal direction of the long carried-material W gripped by the grapple 6 to be at a right angle to the front direction. In addition, the carried-material weight calculation part 61 can accurately calculate the weight of the carried-material W by using the center of gravity distance L1 in the front direction that has been accurately calculated. Therefore, when the carried-material W is loaded onto the dump truck by the work machine 100 of the present embodiment, overloading and underloading of the dump truck can be prevented, and the transportability by the dump truck can be improved.

Note that the configuration of the grapple angle control part 51 is illustrated on the basis of the assumption that the grapple angle control part 51 is configured to detect the longitudinal direction of the long carried-material W based on the rotation angle of the grapple 6 detected by the grapple rotation angle sensor S10, and rotate the gripping part of the grapple 6 to a predetermined rotational position. However, the configuration of the grapple angle control part 51 is not limited to this example.

In a configuration of a work machine 100 according to another embodiment, a long carried-material W gripped by the grapple 6 is imaged by a camera S6F configured to image an area ahead of the work machine 100. The grapple angle control part 51 may be configured to detect the longitudinal direction of the long carried-material W based on the captured image of the carried-material W, and rotate the gripping part of the grapple 6 to a predetermined rotational position. The camera configured to image the long carried-material W gripped by the grapple 6 is not limited to the camera S6F provided on the ceiling or inside of the cabin 10, and may be, for example, a camera mounted on the arm 5.

Thus, the carried-material gravity center distance calculation part 75 (see FIG. 4) can calculate the center of gravity distance L1 (see FIG. 6) in the front direction based on the output of the attitude sensor. When the boom is raised, the carried-material weight processing part 60 (carried-material weight calculation part 61) calculates the weight of the carried-material W (see FIG. 4).

In the weight calculation method of the carried-material W by the work machine 100 according to the present embodiment, the center of gravity distance L1 in the front direction can be accurately calculated in the same manner as the weight calculation method according to the above-described embodiment, so that the weight of the carried-material W can be accurately calculated.

Figure 7A:
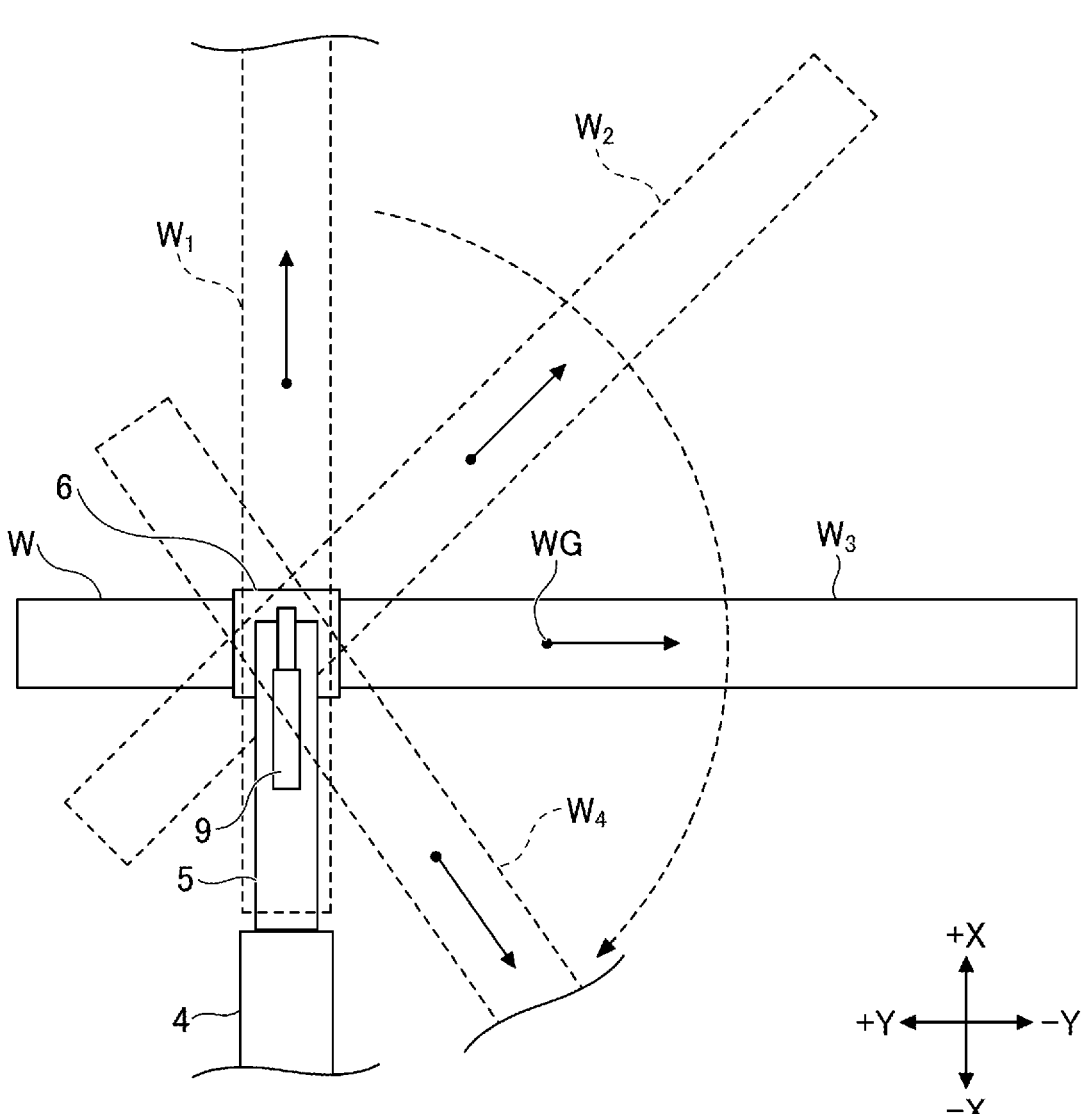
FIG. 7A is a view illustrating a method of detecting a longitudinal direction of a long carried-material gripped by a grapple.
Figure 7B:
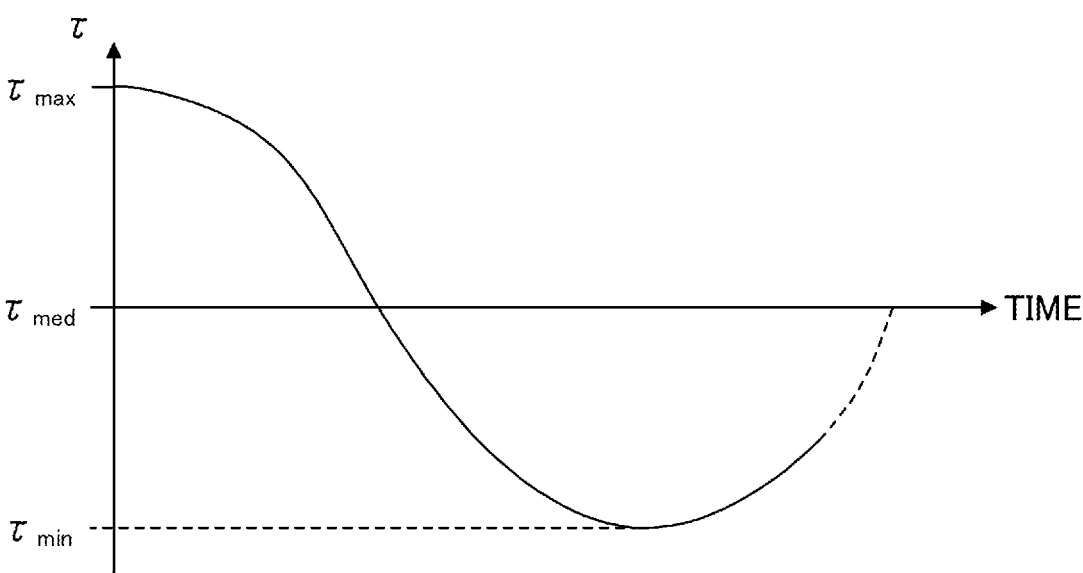
FIG. 7B is a graph illustrating a method of detecting the longitudinal direction of the long carried-material gripped by a grapple.

In a work machine 100 according to still another embodiment, the longitudinal direction of the long carried-material W may be detected based on the variation of torque due to centrifugal force when the carried-material W is rotated around the rotation axis 6d (variation in the pressure of the hydraulic oil of the boom cylinder 7), and the gripping part of the grapple 6 may be rotated to a predetermined rotational position. FIGS. 7A and 7B are views illustrating a method of detecting the longitudinal direction of the long carried-material W gripped by the grapple 6.

As illustrated in FIG. 7A, in a state where the carried-material W is gripped by the grapple 6, the grapple angle control part 51 controls the rotating hydraulic motor 6c to rotate the gripping part of the grapple 6 around the rotation axis 6d (see dashed arrow). While the gripping part of the grapple 6 is rotated, the torque calculation part 71 of the carried-material weight calculation part 61 calculates the torque (detected torque) around the foot pin of the boom 4.

Here, examples of the carried-material W in rotation are illustrated in FIG. 7A as carried-materials $W_1$ to $W_4$. The directions of the centrifugal force in the carried-materials $W_1$ to $W_4$ are indicated by solid arrows.

At the rotational position illustrated in the carried-material $W_1$, the centrifugal force is directed in the +X direction. Therefore, the torque calculated by the torque calculation part 71 is increased by the +X direction component of the centrifugal force. In addition, at the rotational position illustrated in the carried-material $W_2$, the +X direction component of the centrifugal force is decreased compared with the rotational position illustrated in the carried-material $W_1$, and the torque calculated by the torque calculation part 71 is also decreased compared with the rotational position illustrated in the carried-material $W_1$. In addition, at the rotational position illustrated in the carried-material $W_3$, the +X direction component of the centrifugal force is zero, and the torque calculated by the torque calculation part 71 is also decreased compared with the rotational position illustrated in the carried-material $W_2$. Further, at the rotational position illustrated in the carried-material $W_4$, the centrifugal force has a component in the –X direction, and the torque calculated by the torque calculation part 71 is also decreased compared with the rotational position illustrated in the carried-material $W_3$. At the position rotated 180° from the rotational position illustrated in the carried-material $W_1$ (not illustrated), the centrifugal force is directed in the –X direction, and the torque calculated by the torque calculation part 71 is also decreased compared with the rotational position illustrated in the carried-material $W_3$.

FIG. 7B is a graph illustrating variation of the torque $\tau$ calculated by the torque calculation part 71 when the gripping part of the grapple 6 is rotated. The horizontal axis indicates time, and the vertical axis indicates the torque $\tau$ calculated by the torque calculation part 71.

As illustrated in FIG. 7B, by rotating the gripping part of the grapple 6 and rotating the carried-material W around the rotation axis 6d, the torque $\tau$ calculated by the torque calculation part 71 varies between the maximum value $\tau_{max}$ and the minimum value $\tau_{min}$. The maximum value $\tau_{max}$ is obtained at the rotational position illustrated in the carried-material $W_1$, and the minimum value $\tau_{min}$ is obtained at the position rotated 180° from the rotational position illustrated in the carried-material $W_1$. At the median value $\tau_{med}$ between the maximum value $\tau_{max}$ and the minimum value $\tau_{min}$, the longitudinal direction of the long carried-material W gripped by the grapple 6 is at a right angle to the front direction (+X direction) of the work machine 100 (upper turning body 3). Thus, the longitudinal direction of the long carried-material W can be detected based on the variation of torque due to centrifugal force when the carried-material W is rotated around the rotation axis 6d.

The grapple angle control part 51 rotates the gripping part of the grapple 6 to obtain the maximum value $\tau_{max}$ and the minimum value $\tau_{min}$ of the torque $\tau$ calculated by the torque calculation part 71. Then, the grapple angle control part 51 stops the rotation of the gripping part of the grapple 6 at the rotational position where the torque $\tau$ calculated by the torque calculation part 71 becomes the median value $\tau_{med}$. Thus, the longitudinal direction of the long carried-material W gripped by the grapple 6 can be made at a right angle to the front direction (+X direction) of the work machine 100 (upper turning body 3).

In addition, the grapple rotation angle sensor S10 may also be used in combination. That is, the grapple angle control part 51 rotates the gripping part of the grapple 6 to obtain the relationship between the rotation angle detected by the grapple rotation angle sensor S10 and the torque $\tau$ calculated by the torque calculation part 71, and to obtain the maximum value $\tau_{max}$ and the minimum value $\tau_{min}$ of the torque $\tau$. Then, the grapple angle control part 51 specifies the rotation angle at which the torque $\tau$ calculated by the torque calculation part 71 becomes the median value $\tau_{med}$, and rotates the gripping part of the grapple 6 to the specified rotation angle. Thus, the longitudinal direction of the long carried-material W gripped by the grapple 6 can be set at a right angle to the front direction (+X direction) of the work machine 100 (upper turning body 3).

Thus, the carried-material gravity center distance calculation part 75 (see FIG. 4) can calculate the center of gravity distance L1 (see FIG. 6) in the front direction based on the output of the attitude sensor. When the boom is raised, the carried-material weight processing part 60 (carried-material weight calculation part 61) calculates the weight of the carried-material W (see FIG. 4).

In the weight calculation method of the carried-material W in the work machine 100 according to the present embodiment, the center of gravity distance L1 in the front direction can be accurately calculated in the same manner as the weight calculation method of the embodiments already described above, so that the weight of the carried-material W can be accurately calculated.

Figure 8:
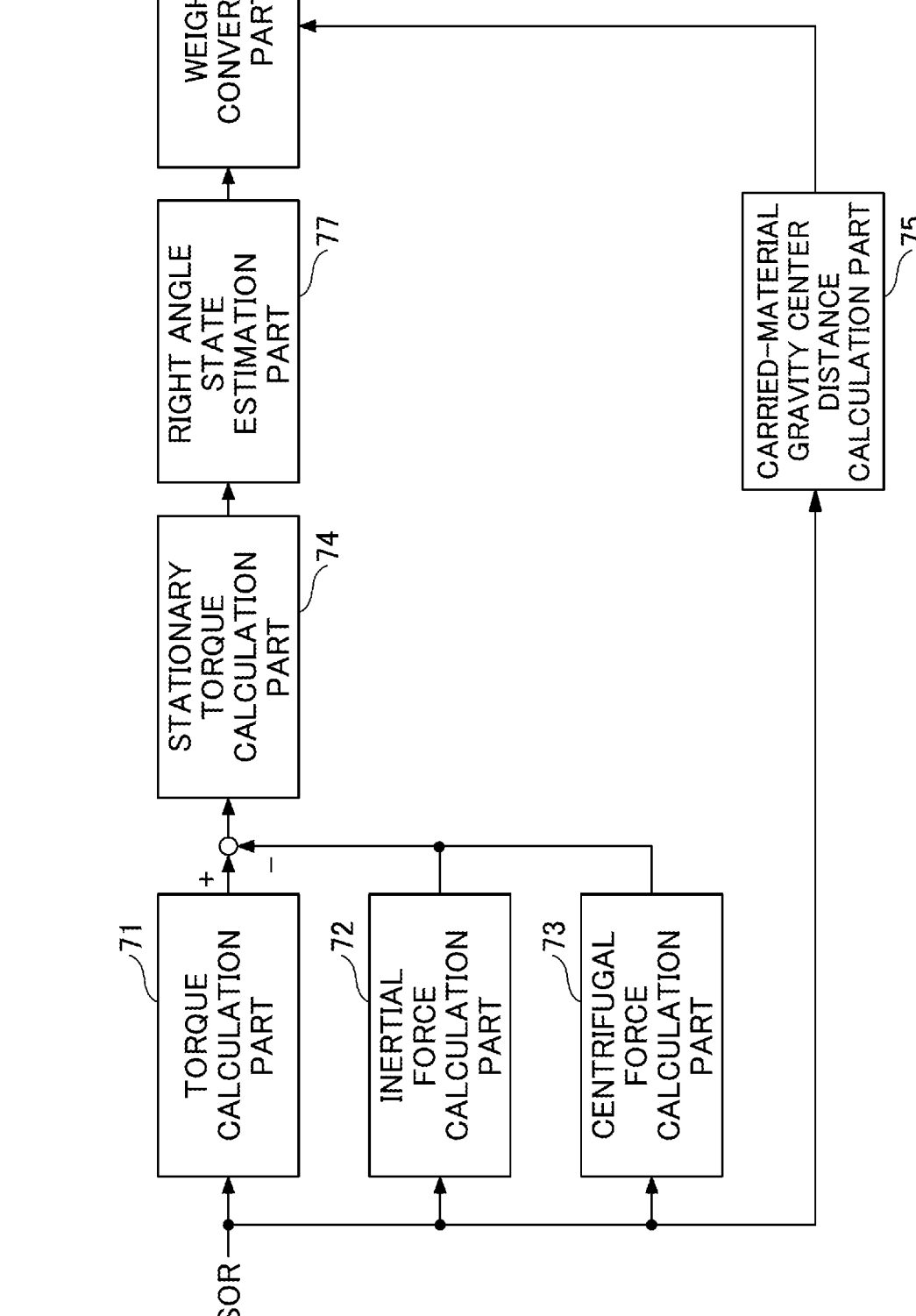
FIG. 8 is a block diagram illustrating processing of a carried-material weight calculation part in a work machine according to another embodiment.

Next, a method of calculating the weight of a long carried-material W in a work machine 100 according to yet another embodiment will be described. FIG. 8 is a block diagram illustrating processing of the carried-material weight calculation part 61 in the work machine 100 according to the present embodiment.

The carried-material weight calculation part 61 in the work machine 100 of the present embodiment includes a torque calculation part 71, an inertia force calculation part 72, a centrifugal force calculation part 73, a stationary torque calculation part 74, a carried-material gravity center distance calculation part 75, a weight conversion part 76, and a right angle state estimation part 77.

Here, in the work machine 100 according to the embodiments already described above, the long carried-material W is gripped by the grapple 6, the gripping part of the grapple 6 is rotated so that the longitudinal direction of the long carried-material W is at a right angle to the front direction (+X direction) of the work machine 100 (upper turning body 3), and then a boom raising operation is performed to calculate the weight of the carried-material W during the boom raising.

By contrast, in the work machine 100 according to the present embodiment, after the long carried-material W is gripped by the grapple 6, the gripping part of the grapple 6 is rotated, and the boom raising operation is performed to calculate the weight of the carried-material W during the boom raising operation.

The torque calculating part 71, the inertia force calculating part 72, the centrifugal force calculating part 73, and the stationary torque calculation part 74 are the same as those of the work machine 100 according to the above-embodiment (see FIG. 4), and the duplicated description is omitted.

Here, the stationary torque $\tau_W$ calculated by the stationary torque calculation part 74 is varied by the centrifugal force when the carried-material W is rotated around the rotation axis 6d.

Based on the stationary torque $\tau_W$ calculated by the stationary torque calculation part 74, the right angle state estimation part 77 estimates a state in which the longitudinal direction of the carried-material W is at a right angle to the front direction (+X direction) of the work machine 100 (upper turning body 3), and outputs the stationary torque in that state. Here, the right angle state estimation part 77 acquires the maximum and minimum values of the varying stationary torque $\tau_W$, and estimates a state in which the longitudinal direction of the carried-material W is at a right angle to the front direction (+X direction) of the work machine 100 (upper turning body 3) when the stationary torque $\tau_W$ becomes the median of the maximum and minimum values.

Further, the carried-material gravity center distance calculation part 75 calculates the center of gravity distance L1 (see FIG. 6) in the front direction based on the output of the attitude sensor at the time when the longitudinal direction of the carried-material W is estimated to be at a right angle to the front direction (+X direction) of the work machine 100 (upper turning body 3).

Then, the weight conversion part 76 calculates the weight of the carried-material W based on the stationary torque $\tau_W$ and the center of gravity distance L1 in the front direction at the time when the longitudinal direction of the carried-material W is estimated to be at a right angle to the front direction (+X direction) of the work machine 100 (upper turning body 3). Thus, the weight conversion part 76 estimates whether or not the carried-material W has rotated to a predetermined rotational position based on the thrust to perform the boom raising operation, and calculates the weight of the carried-material W based on a boom raising thrust when the carried-material W rotates to the predetermined rotational position.

In the weight calculation method of the carried-material W in the work machine 100 according to the present embodiment, the center of gravity distance L1 in the front direction can be accurately calculated in the same manner as the weight calculation method of the above-described embodiments, so that the weight of the carried-material W can be accurately calculated. In addition, since the operation of rotating the gripping part of the grapple 6 before the boom raising operation is unnecessary, the workability of the carrying operation by the work machine 100 can be improved. In addition, the carried-material weight processing part 60 may calculate the weight of the carried-material W in a predetermined control cycle, and adopt the weight calculated when the longitudinal direction of the gripped long carried-material W is estimated to be at a right angle to the front direction (+X direction) of the work machine 100 (upper turning body 3) as the weight of the carried-material W.

Figure 9:
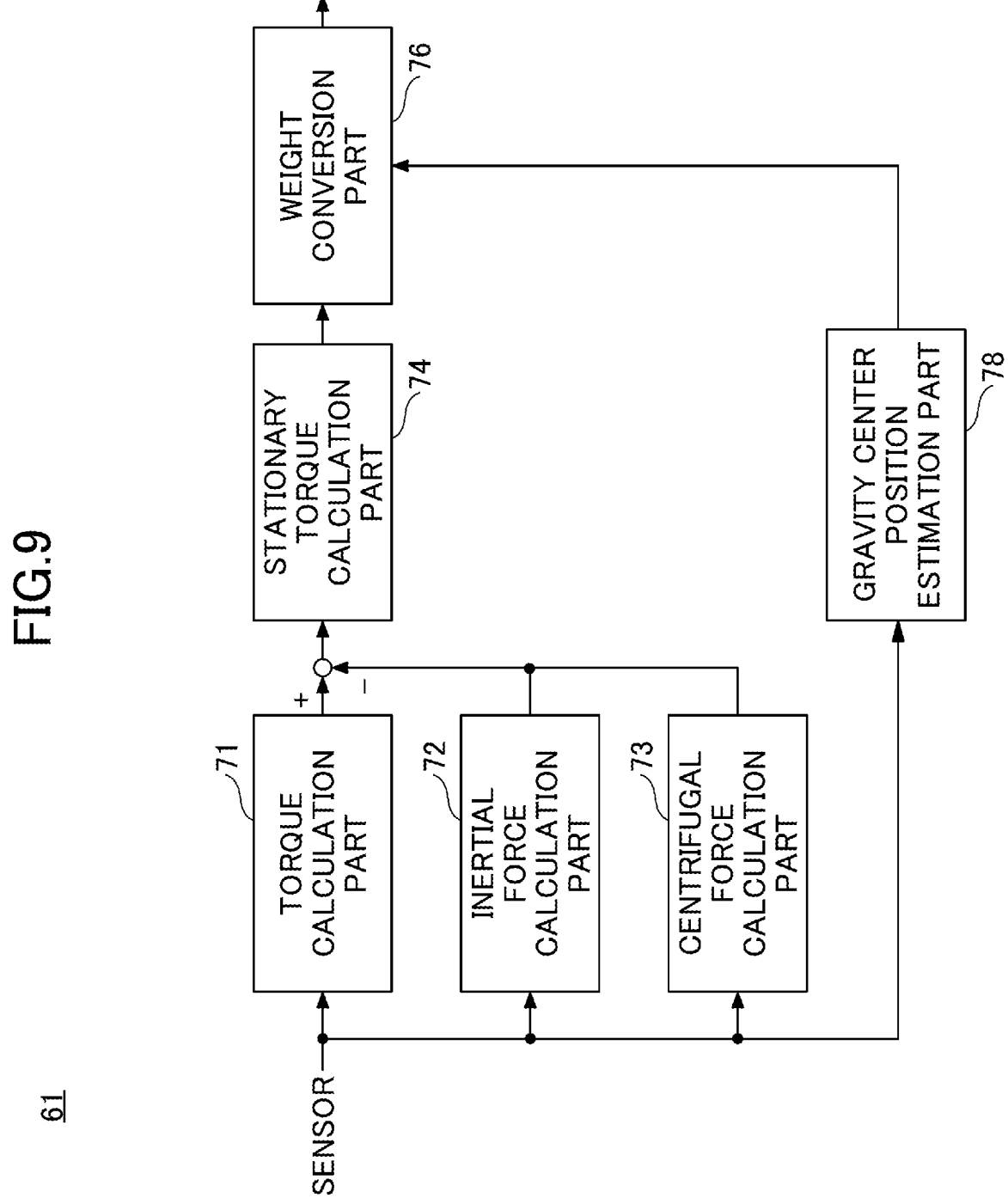
FIG. 9 is a block diagram illustrating processing of a carried-material weight calculation part in a work machine according to still another embodiment.

Next, a method of calculating the weight of a long carried-material W in a work machine 100 according to yet another embodiment will be described. FIG. 9 is a block diagram illustrating processing of the carried-material weight calculation part 61 in the work machine 100 of the present embodiment.

The carried-material weight calculation part 61 in the work machine 100 of the present embodiment includes a torque calculation part 71, an inertia force calculation part 72, a centrifugal force calculation part 73, a stationary torque calculation part 74, a weight conversion part 76, and a gravity center position estimation part 78.

In the work machine 100 according to the present embodiment, a long carried-material W gripped by the grapple 6 is imaged by the camera S6F configured to image an area ahead of the work machine 100.

Based on the captured image of the carried-material W, the gravity center position estimation part 78 detects the total length of the carried-material W in the longitudinal direction, the distance from the end of the carried-material W to the position gripped by the grapple 6, and the rotation angle of the carried-material W in the longitudinal direction around the rotation axis 6d. The position of the grapple 6 can be calculated based on the output of the attitude sensors. The center position in the longitudinal direction of the carried-material W is set as the center of gravity position of the carried-material W.

Thus, the gravity center position estimation part 78 can estimate the center of gravity position of the carried-material W. Based on the estimated center of gravity position of the carried-material W, the gravity center position estimation part 78 can estimate the horizontal distance in the front direction (center of gravity distance in the front direction) of the work machine 100 (upper turning body 3) from the foot pin of the boom 4 to the center of gravity position WG of the carried-material W gripped by the grapple 6.

The weight conversion part 76 calculates the weight of the carried-material W based on the stationary torque $\tau_W$ calculated by the stationary torque calculation part 74 and the center of gravity distance in the front direction estimated by the gravity center position estimation part 78.

In the weight calculation method of the carried-material W in the work machine 100 according to the present embodiment, the center of gravity distance in the front direction can be estimated, and the weight of the carried-material W can be accurately calculated. Moreover, since the operation of rotating the gripping part of the grapple 6 before and during the boom raising operation can be omitted, the workability of the carrying operation by the work machine 100 can be improved.

Next, a method of calculating the weight of a long carried-material W in a work machine 100 according to further another embodiment will be described.

The carried-material weight calculation part 61 of the work machine 100 of the present embodiment has a torque calculation part 71, an inertia force calculation part 72, a centrifugal force calculation part 73, a stationary torque calculation part 74, a weight conversion part 76, and a gravity center position estimation part 78, similar to the carried-material weight calculation part 61 of the above-described embodiment (see FIG. 9).

Here, in the work machine 100 according to the present embodiment, the camera S6F configured to image an area ahead of the work machine 100 images a long carried-material W gripped by the grapple 6. The controller 30 acquires the total length of the carried-material W in the longitudinal direction based on the captured image of the carried-material W. The grapple 6 is provided with an angle sensor (not illustrated) configured to detect the opening/closing angle of the claw part 6a. Based on the angle sensor, the controller 30 estimates the diameter of the carried-material W gripped by the gripping part of the grapple 6. The controller 30 also estimates a material of the carried-material W based on the captured image of the carried-material W. The material may be input by an operator. The storage device 47 is provided with a table for associating the material with the density. Thus, the controller 30 calculates the temporary weight of the carried-material W based on the total length in the longitudinal direction of the carried-material W, the diameter of the carried-material W, and the material (density).

The controller 30 (grapple angle control part 51) also controls the rotating hydraulic motor 6c to rotate the long carried-material W gripped by the grapple 6 around the rotation axis 6d.

The gravity center position estimation part 78 estimates the center of gravity position of the carried-material W, based on the calculated temporary weight of the carried-material W and the rotational torque when the carried-material W is rotated by the rotating hydraulic motor 6c. Based on the estimated center of gravity position of the carried-material W, the gravity center position estimation part 78 can estimate the horizontal distance in the front direction (center of gravity distance in the front direction) of the work machine 100 (upper turning body 3) from the foot pin of the boom 4 to the center of gravity position WG of the carried-material W gripped by the grapple 6.

The weight conversion part 76 calculates the weight of the carried-material W based on the stationary torque $\tau_W$ calculated by the stationary torque calculation part 74 and the center of gravity distance in the front direction estimated by the gravity center position estimation part 78.

In the weight calculation method of the carried-material W in the work machine 100 of the present embodiment, the center of gravity distance in the front direction can be estimated, and the weight of the carried-material W can be accurately calculated. In the weight calculation method of the present embodiment, the rotation angle of the carried-material W at the time of raising the boom is not limited to this example. Thus, the workability of the carrying operation by the work machine 100 can be improved.

Although the embodiments, etc. of the work machine 100 have been described above, the present invention is not limited to the above embodiments, etc., and various modifications and improvements can be made within the scope of the gist of the present invention described in the claims.

The carried-material weight processing part 60 (carried-material weight calculation part 61) of the work machine 100 has been described as being provided in the controller 30 of the work machine, as illustrated in FIGS. 2, 3, 5, etc., but the configuration is not limited to this example. For example, the carried-material weight processing part 60 (carried-material weight calculation part 61) of the work machine 100 may be provided in a management device (a work machine support system) provided separately from the work machine.

In this configuration, the work machine 100 transmits detection values detected by various sensors to the management device through the communication device T1. The carried-material weight processing part 60 (carried-material weight calculation part 61) of the management device calculates the load weight of the vehicle loaded on the vehicle based on the detection values of various sensors. The other configuration is the same as the case where the carried-material weight processing part 60 (carried-material weight calculation part 61) is provided in the controller 30 of the work machine 100, and the duplicated description is omitted.

The above-described configuration may also be applied to a remotely operated work machine 100. In this case, information is transmitted and received between the controller 30 of the work machine 100 and a remote control room via wireless communication of the communication device T1. As a result, the work machine 100 operates based on the operation of a remote operator sitting on an operator's seat in the remote control room connected to the work machine 100 via wireless communication.

According to the above-described embodiments, it is desirable to provide a work machine and a work machine support system that accurately calculate the weight of a carried-material when the work machine is designed for gripping and carrying a long carried-material.

It should be understood that the invention is not limited to the above-described embodiment, but may be modified into various forms on the basis of the spirit of the invention. Additionally, the modifications are included in the scope of the invention.

DESCRIPTION OF THE REFERENCE NUMERALS

W carried-material
100 work machine
4 boom
5 arm
6 grapple
6a claw part
6b grapple open-close cylinder
6c rotating hydraulic motor
6d rotation axis
7 boom cylinder
8 arm cylinder
9 end attachment cylinder
30 controller
60 carried-material weight processing part
61 weight calculation part
62 maximum load detection part
63 addition load calculation part
64 remaining load calculation part
71 torque calculation part
72 inertial force calculation part
73 centrifugal force calculation part
74 stationary torque calculation part
75 carried-material gravity center distance calculation part
76 weight conversion part
77 right angle state estimation part
78 gravity center position estimation part
S1 boom angle sensor
S2 arm angle sensor
S3 end attachment angle sensor
S4 airframe inclination sensor
S5 turning state sensor
S6 imaging device
S7R boom rod pressure sensor
S7B boom bottom pressure sensor
S10 grapple rotation angle sensor

What is claimed is:

1. A work machine comprising:
an attachment rotatably attached to an upper turning body, the attachment being rotatable about a first rotation axis oriented in a vehicle width direction of the upper turning body;
a gripping part rotatably attached to the attachment, the gripping part being rotatable about a second rotation axis in a plane to which the first rotation axis is normal, the gripping part being configured to grip a long carried-material; and
processing circuitry, configured to calculate a weight of the long carried-material at a predetermined rotational position of the gripping part where a longitudinal direction of the long carried-material gripped by the gripping part is at a right angle to a front direction of the upper turning body, based on a torque for rotating the attachment.

2. The work machine according to claim 1, further comprising:
a sensor configured to detect a rotational position of the gripping part,
wherein the processing circuitry is further configured to rotate the gripping part to the predetermined rotational position based on an output of the sensor.

3. The work machine according to claim 1, further comprising:
an imaging device configured to image the gripping part,
wherein the processing circuitry is configured to detect a rotational position of the long carried-material based on an image of the gripping part captured by the imaging device and rotate the gripping part to the predetermined rotational position.

4. The work machine according to claim 1,
wherein the processing circuitry is configured to detect a rotational position of the long carried-material based on a change in the torque for rotating the attachment when the gripping part is rotated and rotate the gripping part to the predetermined rotational position.

5. The work machine according to claim 1,
wherein the processing circuitry is configured to
rotate the attachment while rotating the gripping part,
estimate whether the gripping part is rotated to the predetermined rotational position based on a thrust for rotating the attachment, and
calculate the weight of the long carried-material based on the thrust of the attachment when the gripping part is rotated to the predetermined rotational position.

6. The work machine according to claim 1,
wherein the processing circuitry is configured to calculate the weight of the long carried-material while the long carried-material is gripped by the gripping part.

7. The work machine according to claim 1, wherein the longitudinal direction of the long carried-material gripped by the gripping part is the vehicle width direction of the upper turning body at the predetermined rotational position of the gripping part.

8. The work machine according to claim 1, wherein the longitudinal direction of the long carried-material gripped by the gripping part is parallel to the first rotation axis of the attachment at the predetermined rotational position of the gripping part.

9. The work machine according to claim 1, further comprising:
an attitude sensor configured to detect an attitude of the work machine,
wherein the attachment includes a boom attached to the upper turning body, and
the processing circuitry is further configured to
calculate a gravity center distance based on an output of the attitude sensor, the gravity center distance being a horizontal distance from a foot pin of the boom to a center of gravity position of the long carried-material gripped by the gripping part in the front direction of the upper turning body, and
calculate the weight of the long carried-material using the calculated gravity center distance.

10. The work machine according to claim 1, wherein the processing circuitry is further configured to obtain a maximum value and a minimum value of the torque for rotating the attachment when the gripping part is rotated, and
stop a rotation of the gripping part at a rotational position where the torque is a median value between the maximum value and the minimum value.

11. The work machine according to claim 1, wherein the processing circuity is further configured to
rotate the gripping part gripping the long carried-material so that the longitudinal direction of the long carried-material gripped by the gripping part is at the right angle to the front direction of the upper turning body, and
thereafter perform a boom raising operation and calculate the weight of the long carried-material during the boom raising operation.

12. A work machine comprising:
an attachment rotatably attached to an upper turning body;
a gripping part rotatably attached to the attachment, the gripping part being configured to grip a long carried-material;
an imaging device configured to capture an image of the long carried-material gripped by the gripping part; and
processing circuitry configured to
estimate a center of gravity position of the long carried-material based on the image of the long carried-material captured by the imaging device, and
calculate a weight of the long carried-material based on the estimated center of gravity position and a thrust for rotating the attachment.

13. The work machine according to claim 12, wherein
the attachment is rotatable about a first rotation axis oriented in a vehicle width direction of the upper turning body, and
the gripping part is rotatable about a second rotation axis in a plane to which the first rotation axis is normal.

14. The work machine according to claim 13, wherein the processing circuitry is further configured to
detect a total length of the long carried-material, a distance from an end of the long carried-material to a position gripped by the gripping part, and a rotation angle of the long carried-material in a longitudinal direction thereof about the second rotation axis, based on the image of the long carried-material captured by the imaging device, and
estimate the center of gravity position of the long carried-material based on the detected total length, distance, and rotation angle.

15. The work machine according to claim 13, wherein the processing circuitry is further configured to
acquire a total length of the long carried-material based on the image of the long carried-material captured by the imaging device,
estimate a diameter of the long carried-material gripped by the gripping part based on an output of an angle sensor configured to detect an opening or closing angle of the gripping part,
calculate a temporary weight of the long carried-material based on the acquired total length, the estimated diameter, and a material of the long carried-material,
control a rotating hydraulic motor to rotate the long carried-material gripped by the gripping part about the second rotation axis, and
estimate the center of gravity position of the long carried-material based on the calculated temporary weight of the long carried-material and a rotational torque when the long carried-material is rotated by the rotating hydraulic motor.

16. A work machine support system for a work machine, the work machine including an attachment rotatably attached to an upper turning body, the attachment being rotatable about a first rotation axis oriented in a vehicle width direction of the upper turning body, and a gripping part rotatably attached to the attachment, the gripping part being rotatable about a second rotation axis in a plane to which the first rotation axis is normal, the gripping part being configured to grip a long carried-material, the work machine support system comprising:

processing circuitry configured to calculate a weight of the long carried-material at a predetermined rotational position of the gripping part where a longitudinal direction of the long carried-material gripped by the gripping part is at a right angle to a front direction of the upper turning body, based on a torque for rotating the attachment of the work machine,
    wherein the processing circuitry is configured to calculate the weight of the long carried-material while the long carried-material is gripped by the gripping part of the work machine.

17. The work machine support system according to claim 16, wherein the longitudinal direction of the long carried-material gripped by the gripping part is the vehicle width direction of the upper turning body at the predetermined rotational position of the gripping part.

18. The work machine support system according to claim 16, wherein the longitudinal direction of the long carried-material gripped by the gripping part is parallel to the first rotation axis of the attachment at the predetermined rotational position of the gripping part.

19. The work machine support system according to claim 16, wherein the work machine includes an attitude sensor configured to detect an attitude of the work machine,
    the attachment includes a boom attached to the upper turning body, and
    the processing circuitry is further configured to
        calculate a gravity center distance based on an output of the attitude sensor, the gravity center distance being a horizontal distance from a foot pin of the boom to a center of gravity position of the long carried-material gripped by the gripping part in the front direction of the upper turning body, and
        calculate the weight of the long carried-material using the calculated gravity center distance.

20. The work machine support system according to claim 16, wherein the processing circuity is further configured to obtain a maximum value and a minimum value of the torque for rotating the attachment when the gripping part is rotated, and
    stop a rotation of the gripping part at a rotational position where the torque is a median value between the maximum value and the minimum value.

* * * * *